(12) United States Patent
Gretz (10) Patent No.: US 9,035,177 B1
(45) Date of Patent: May 19, 2015

(54) SPACER DEVICE AND METHOD FOR DEPTH ADJUSTMENT OF ELECTRICAL COMPONENTS IN A RECESSED ELECTRICAL BOX

(71) Applicant: Thomas J. Gretz, Port St. Lucie, FL (US)

(72) Inventor: Thomas J. Gretz, Port St. Lucie, FL (US)

(73) Assignee: ARLINGTON INDUSTRIES, INC., Scranton, PA (US)

(*) Notice: Subject to any disclaimer, the term of this patent is extended or adjusted under 35 U.S.C. 154(b) by 0 days.

(21) Appl. No.: 14/183,638

(22) Filed: Feb. 19, 2014

Related U.S. Application Data (60) Provisional application No. 61/767,566, filed on Feb. 21, 2013.

(51) Int. Cl.
*H02G 3/12* (2006.01)
(52) U.S. Cl.
CPC ........................... *H02G 3/12* (2013.01)

(58) Field of Classification Search
USPC .................. 174/50, 53, 66; 248/300; 439/135
See application file for complete search history.

(56) References Cited

U.S. PATENT DOCUMENTS 6,101,731 A * 8/2000 Mesa .............................. 33/528
8,067,703 B1 * 11/2011 Gretz ............................ 174/659

* cited by examiner

Primary Examiner — Dhirubhai R Patel (57) ABSTRACT

A device and method for configuring a recessed electrical box for the mounting of electrical components at a shallow depth with respect to the mounting surface. The device and method includes a spacer for adjusting the depth at which an electrical component is mounted within a recessed electrical box. The spacer includes a frame member with side members and end members that define an opening therein. A front face on the spacer is adapted to accept the mounting of two electrical components thereto. A rear face on the spacer is adapted to fit flush against the peripheral wall of a recessed electrical box assembly. Two arms extending from each end member of the spacer include apertures therein for acceptance of fasteners for mounting the electrical components. The spacer enables an installer to mount an electrical component at a shallow depth within a recessed electrical box.

11 Claims, 10 Drawing Sheets

SPACER DEVICE AND METHOD FOR DEPTH ADJUSTMENT OF ELECTRICAL COMPONENTS IN A RECESSED ELECTRICAL BOX

This application claims the priority of U.S. Provisional Application Ser. No. 61/767,566 filed Feb. 21, 2013.

FIELD OF THE INVENTION

The present invention relates to the installation of electrical components and specifically to a spacer for depth adjustment of electrical components in a recessed electrical box.

BACKGROUND OF THE INVENTION

There is a continuing need to provide electrical boxes which recess electrical components within the wall of a structure. Electrical components are commonly mounted on walls and similar surfaces to provide various electrical services in the home. It is beneficial to recess some electrical components, such duplex receptacles, deep within the wall in order to provide adequate space for the plug ends of electrical cords that will be plugged into the duplex receptacle. Other components such as switches are typically mounted at a shallow depth in order to provide easy access for users to manipulate the switch.

Recessed electrical boxes are used to mount electrical components deep within the wall. However, in many situations it is necessary to mount the electrical component at a shallow depth within the recessed electrical box. In the current state of the art, the recessed electrical box is limited to mounting electrical components at a single depth within the wall.

Accordingly, there is a need for a device and method for configuring a recessed electrical box to mount electrical components shallow or deep within the wall, as desired by the installer. Such a device and method would increase the usability of the recessed electrical box and make it unnecessary to stock two types of box, one for the shallow mounting of components and one for deep mounting of components with respect to the wall.

BRIEF SUMMARY OF THE INVENTION

The current invention is a device and method for configuring a recessed electrical box to mount electrical components at a shallow depth with respect to the mounting surface. The device and method includes a spacer for adjusting the depth at which an electrical component is mounted within a recessed electrical box. The spacer includes a frame member with side members and end members that define an opening therein. A front face on the spacer is adapted to accept the mounting of two electrical components thereto. A rear face on the spacer is adapted to fit flush against the peripheral wall of a recessed electrical box assembly. Two arms extending from each end member of the spacer include apertures therein for acceptance of fasteners for mounting the electrical components. The spacer enables an installer to mount an electrical component at a shallow depth within a recessed electrical box.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
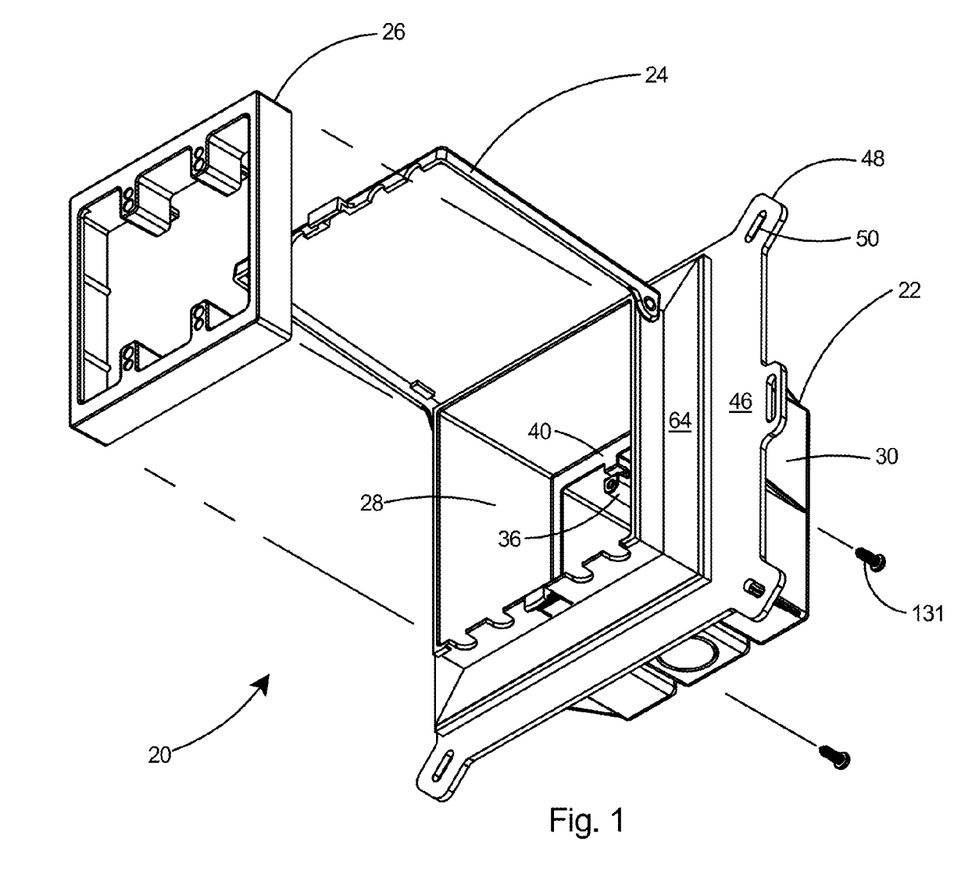
FIG. 1 is an isometric view of a preferred embodiment of an electrical box and spacer assembly in accordance with embodiments of the invention.

With reference to FIG. 1, the present invention comprises an electrical box and spacer assembly 20 for mounting electrical components. The electrical box and spacer assembly 20 includes an electrical box 22 with a hinged cover 24 and an optional spacer 26 that may be used at the installer's discretion to reduce the depth of the electrical box inner cavity 28.

Figure 2:
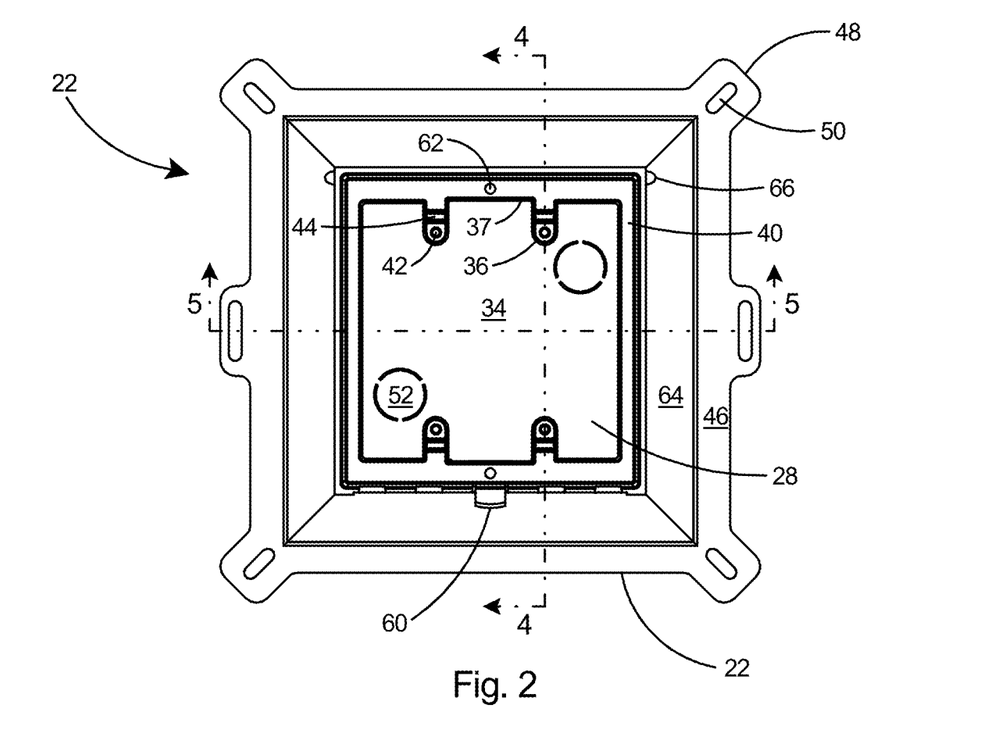
FIG. 2 is a front view of a preferred embodiment of an electrical box which forms a portion of the electrical box and spacer assembly of FIG. 1.
Figure 3:
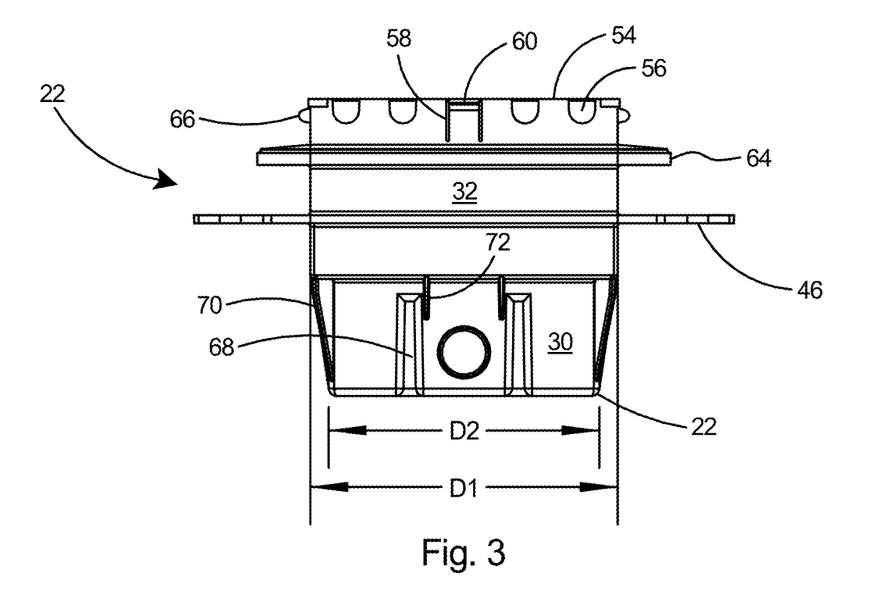
FIG. 3 is a top view of the electrical box of FIG. 2.
Figure 4:
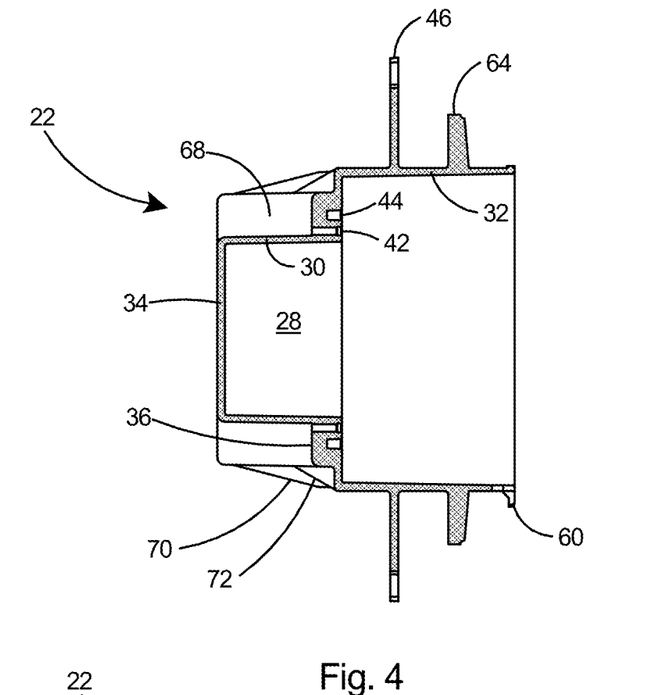
FIG. 4 is a sectional view of the electrical box taken along line 4-4 of FIG. 2.
Figure 5:
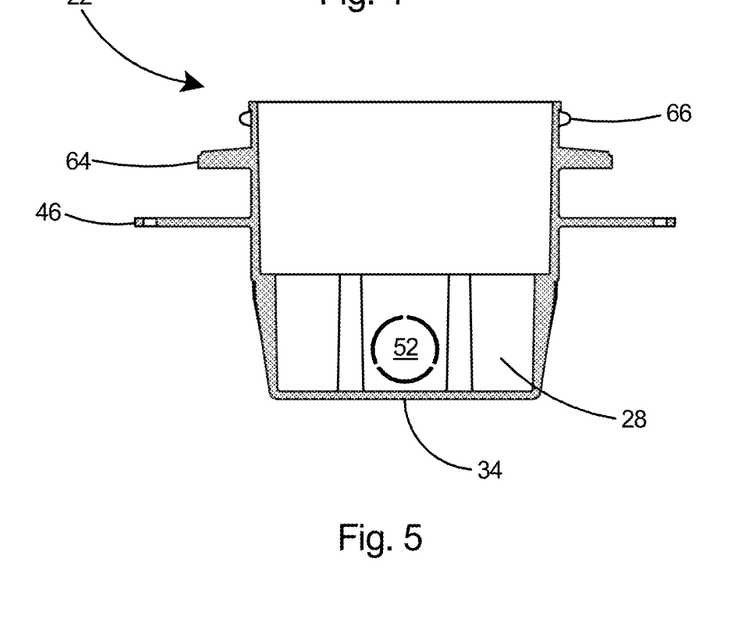
FIG. 5 is a sectional view of the electrical box taken along line 5-5 of FIG. 2.

Referring to FIGS. 2-3, the electrical box 22 includes four inner sidewalls 30, four outer sidewalls 32, and a back wall 34 that define the inner enclosure or cavity 28. Outer sidewalls 32 are of a larger dimension D1 than the inner sidewalls 30 of dimension D2. Four bosses 36 extend from the inner surface 37 of the inner sidewalls 30. A peripheral wall 40 extends between the inner sidewalls 30 and outer sidewalls 32. Outer sidewalls 32 and peripheral wall 40 define the inner cavity 28. Bosses 36 include component mounting bores 42 therein and a groove 44 adjacent the bores 42 and extending fully across each boss 36. The electrical box 22 includes an inner flange 46 including a plurality of ears 48 and a slot 50 in each of the ears. Knockout wall portions 52 are included in the back wall 34 and the inner sidewalls 30. One outer sidewall 32 includes a front edge 54 and four cord openings 56 therein. Two grooves 58 in the outer sidewall 32 extend inward from the front edge 54. The grooves 58 define a deflectable latch 60. Two axially aligned apertures or bores 62 are included therein on opposing sides of the peripheral wall 40, the axially aligned apertures 62 located substantially centered between the two bosses 36. Electrical box 20 may further include an outer flange 64 and two axially aligned posts 66 extending from the outer sidewall 32. Inner sidewalls 30 further include a plurality of recesses 68 formed therein and corner ribs 70 and interior ribs 72 extending outward therefrom.

Figure 6:
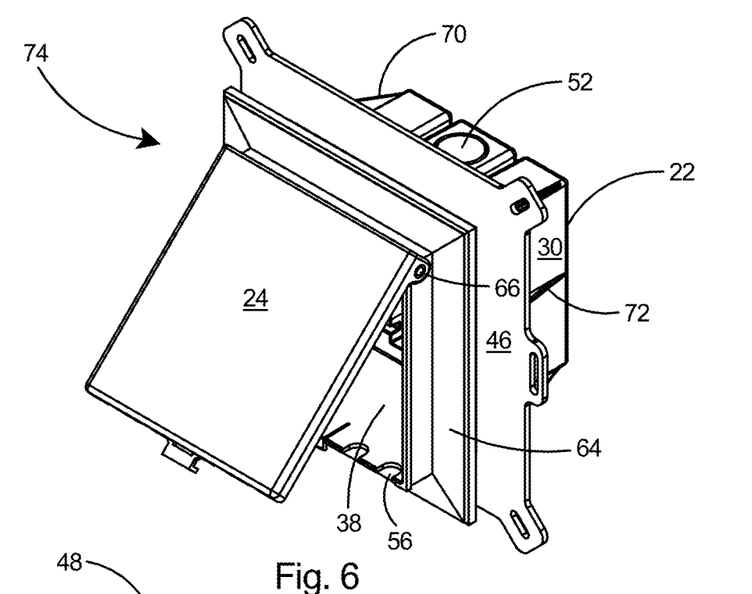
FIG. 6 is a front perspective view of the electrical box with a cover member attached.
Figure 7:
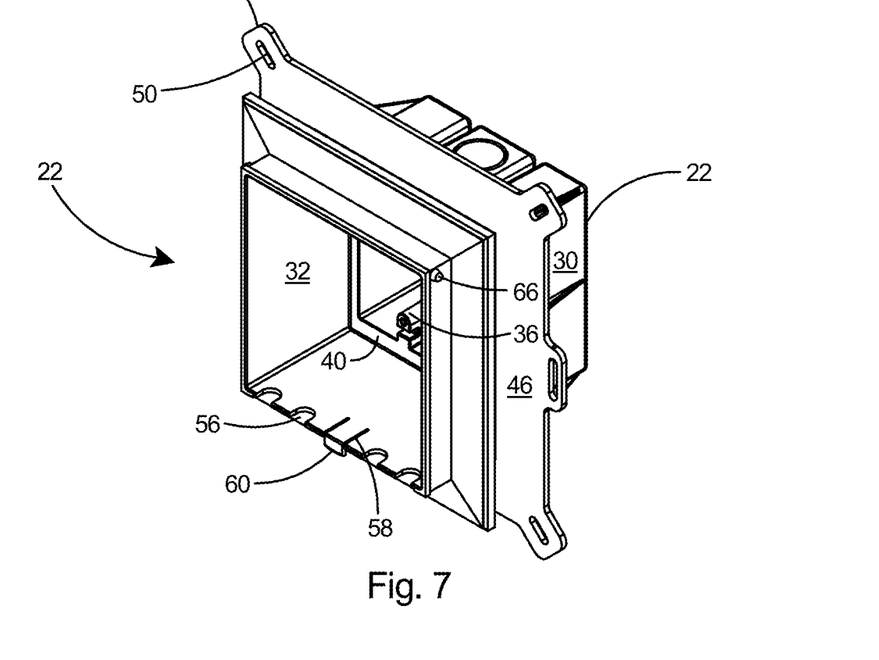
FIG. 7 is a front perspective view of the electrical box without the cover.

With reference to FIGS. 6 and 7, electrical box 22 can be used with cover member 24 engaged on posts 66 to form an electrical box assembly 74 in which peripheral wall 40 is recessed deep within the box enclosure 38. The four outer sidewalls 32 and the peripheral wall 40 define the box enclosure 38. As shown in FIG. 7, an electrical component (not shown) may be mounted to bosses 36, which would recess the electrical component well behind the wall surface.

Figure 8:
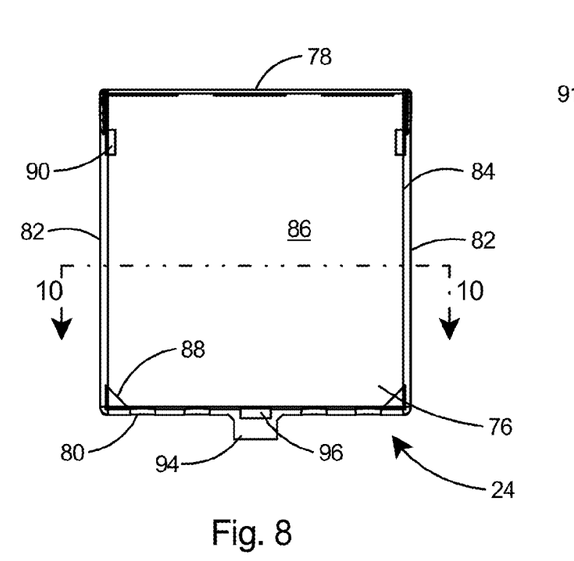
FIG. 8 is a front view of the preferred embodiment of a cover member which forms a portion of the electrical box and spacer assembly of FIG. 1.
Figure 9:
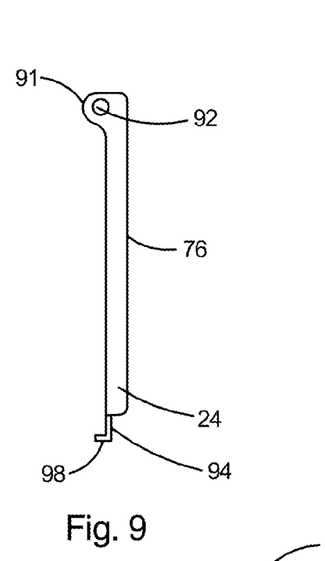
FIG. 9 is a side view of the cover.
Figures 10, 11:
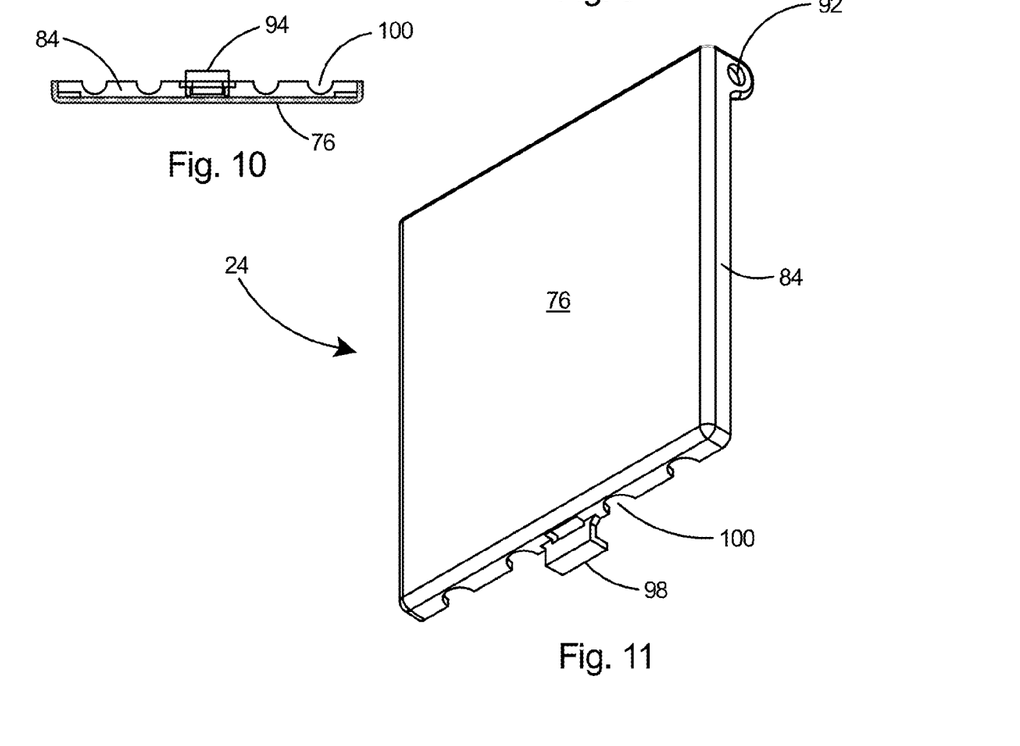
FIG. 10 is a sectional view of the cover taken along line 10-10 of FIG. 8.
FIG. 11 is a front perspective view of the cover.

Referring to FIGS. 8-11, cover member 24 includes a faceplate 76 with a top 78, a bottom 80, and two sides 82. A peripheral wall 84 extends around the entire rear periphery of the cover 24. As shown in FIG. 8, the rear surface 86 of the cover 24 includes two corner filets 88 along the bottom 80 that add strength at the bottom edge of the cover. Two offset tabs 90 extend from opposing sides of the rear surface 86 near the top 78 of the cover 24. Opposing sides of the peripheral wall 84 include ears 91 with apertures 92 therein. A tab 94 extends from the cover bottom 80 and includes an opening 96 therein. As shown in FIG. 9, tab 94 includes a rearward-extending leg 98. The peripheral wall 84 includes a plurality of cord openings 100 therein along the bottom of the cover member.

Figure 12:
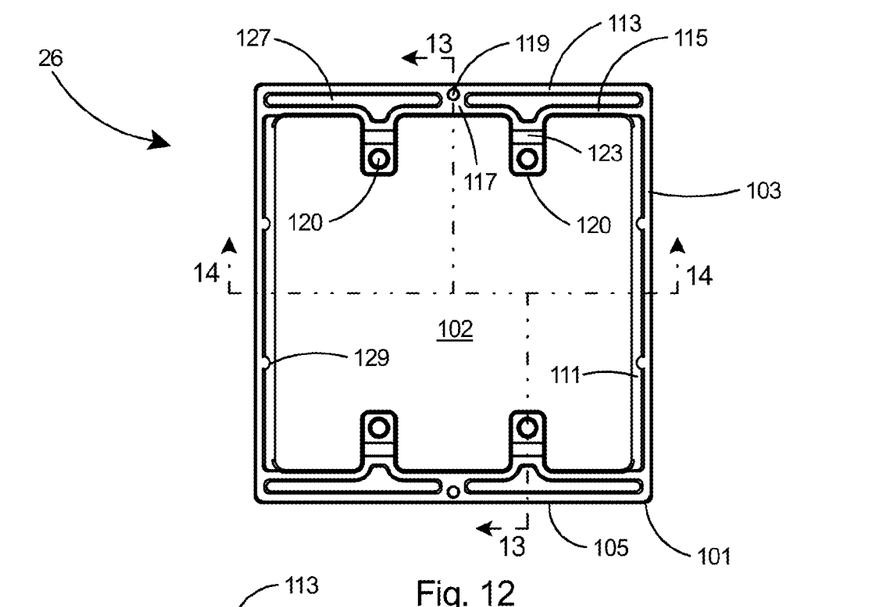
FIG. 12 is a rear elevation view of the preferred embodiment of a spacer which forms a portion of the electrical box and spacer assembly of FIG. 1.
Figures 13, 14:
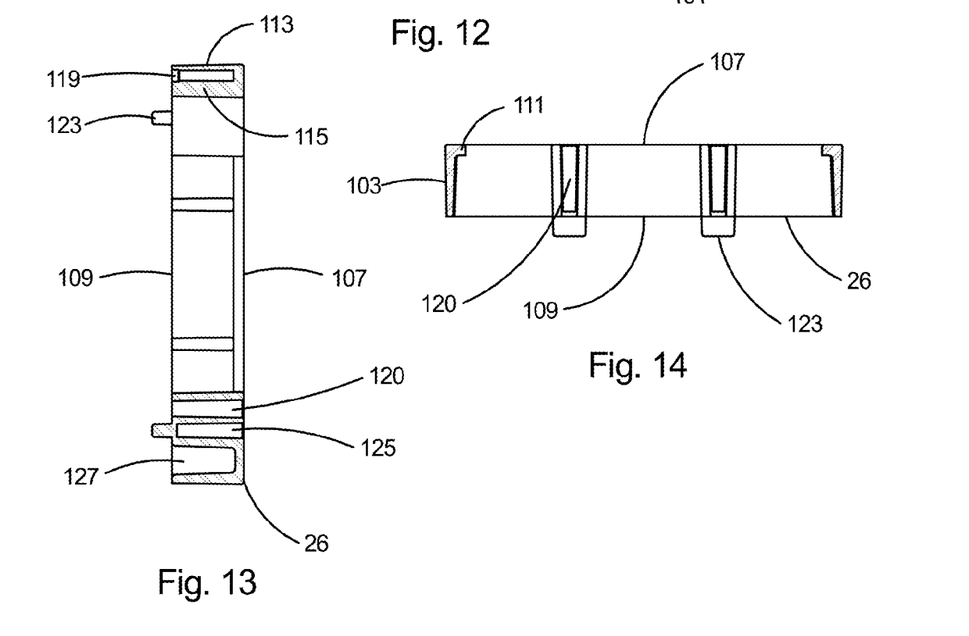
FIG. 13 is a sectional view of the spacer taken along line 13-13 of FIG. 12.
FIG. 14 is a sectional view of the spacer taken along line 14-14 of FIG. 12.

With reference to FIGS. 12-14, the optional spacer 26 of the present invention includes a frame member 101 having a central opening 102, two side members 103, two end members 105, a front face 107, a rear face 109, and a peripheral wall 111 extending orthogonally from the front face 107 of the frame member 101. The end members 105 include an outer wall 113 and an inner wall 115 with an opening 127 there between and a bridge 117 extending between the outer wall 113 and inner wall 115. Bridge 117 includes an aperture 119 therein. Two arms 120 extend inward from the two end members 105 of the frame. Arms 120 include a through bore 121 that extends completely through the arm 120, an alignment tab 123 extending from the arm 120 at the rear face 109 of the frame 101, and an aperture 125 extending into the arm 120 from the front face 107. The alignment tabs 123 extend outward from the planar rear face 109. The frame 101 includes openings 127 therein between the outer wall 113 and inner wall 115 on either side of the bridge 117. A plurality of integral ribs 129 extend inward from the side members 103.

Figure 15:
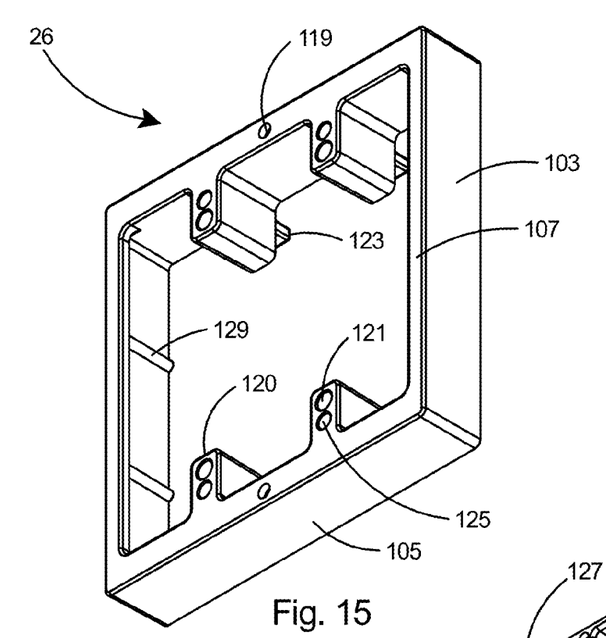
FIG. 15 is a front isometric view of the spacer.
Figure 16:
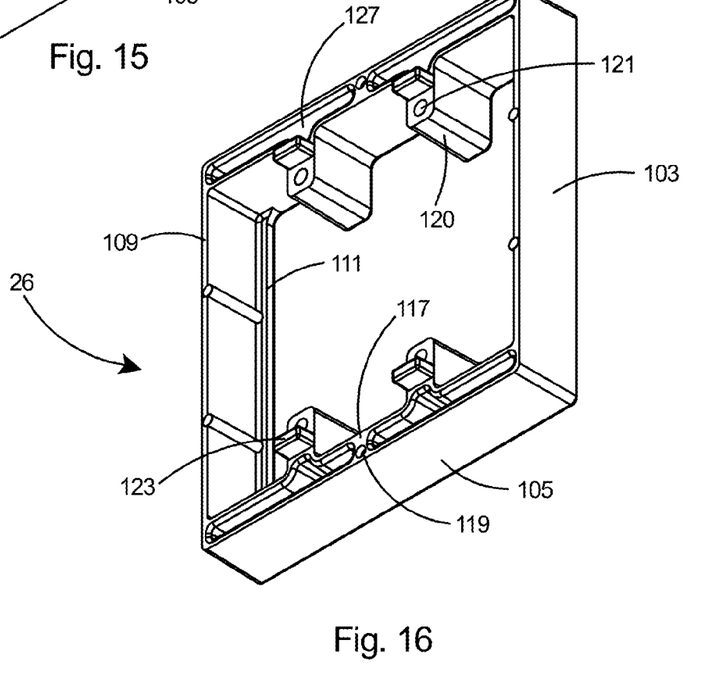
FIG. 16 is a rear isometric view of the spacer.

Referring to FIGS. 15 and 16, front face 107 and rear face 109 of spacer 26 are each planar. Through bores 121 and apertures 125 are available for insertion of fasteners (not shown) thereto for the connection of electrical components to the spacer 26. As shown in FIG. 16, alignment tabs 123 extend from the bosses 120 of the spacer.

Figure 17:
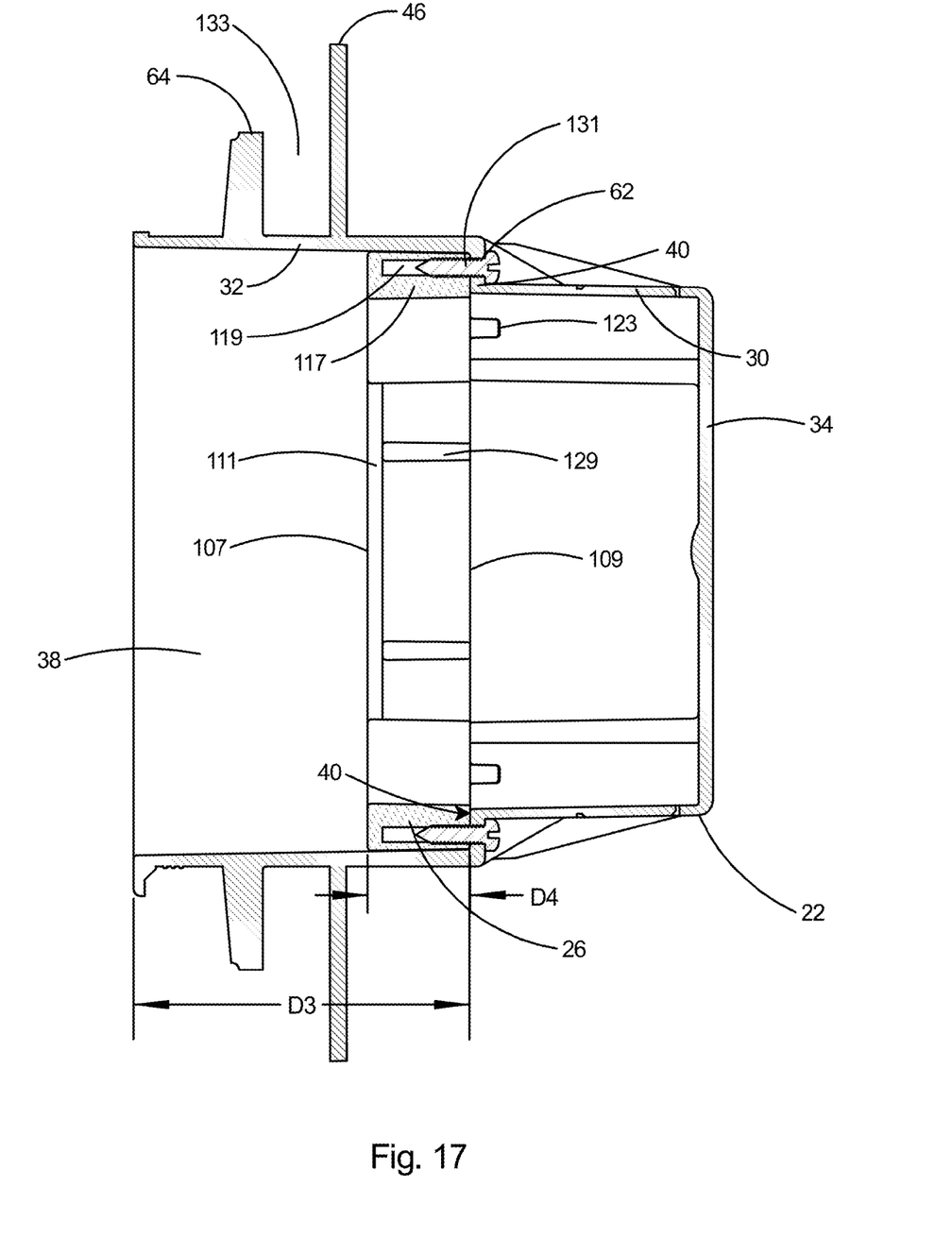
FIG. 17 is a sectional view depicting a spacer installed in an electrical box according to the present invention.

FIG. 17 illustrates the connection of the spacer 26 to the electrical box 22 in order to reduce the distance an electrical component is recessed within the wall. To reduce the recessed distance, spacer 26 is inserted within the box enclosure 38 until rear face 109 of spacer 26 seats against the planar face 132 (see FIG. 18) of the peripheral wall 40 of electrical box 22. With spacer 26 seated against peripheral wall 40, apertures 62 in peripheral wall 40 of electrical box 22 are in alignment with apertures 119 in bridge 117 portion of spacer 26. A fastener 131 is then driven through peripheral wall 40 of electrical box 22 into aperture 119 to secure the spacer within the electrical box. A channel 133 is provided on the exterior of electrical box 22 between inner flange 46 and outer flange 64 for accommodating siding.

With reference to FIG. 17, to operate the invention a hole, large enough to accommodate inner sidewalls 30 is cut in the substrate of a building. Electrical box 22 is then inserted in the hole (not shown) until inner flange 46 is flush against the wall of the building. Fasteners (not shown) may then be inserted through slots 50 (see FIG. 2) in flange 46 to secure the electrical box to the substrate. As exterior siding is installed around the secured box, it is inserted into channel 133. As outer sidewalls 32 are integral with flanges 46 and 64, any rain or water running down the siding will be channeled to the bottom side of the electrical box and then away from the electrical box. Electrical box 22 provides a substantially deep enclosure 38 for recessing an electrical component. As an example, without the spacer 26, distance D3 in FIG. 17 depicts the depth at which a component will be mounted in the electrical box 22. Distance D3 is preferably 2.875 inches. The width of spacer 26, denoted by distance D4 in FIG. 17, is preferably 0.875 inch. Thus use of spacer 26 within electrical box 22 reduces the mounting depth of the electrical component to 2.0 inches, which is preferable for many low voltage components.

Figure 18:
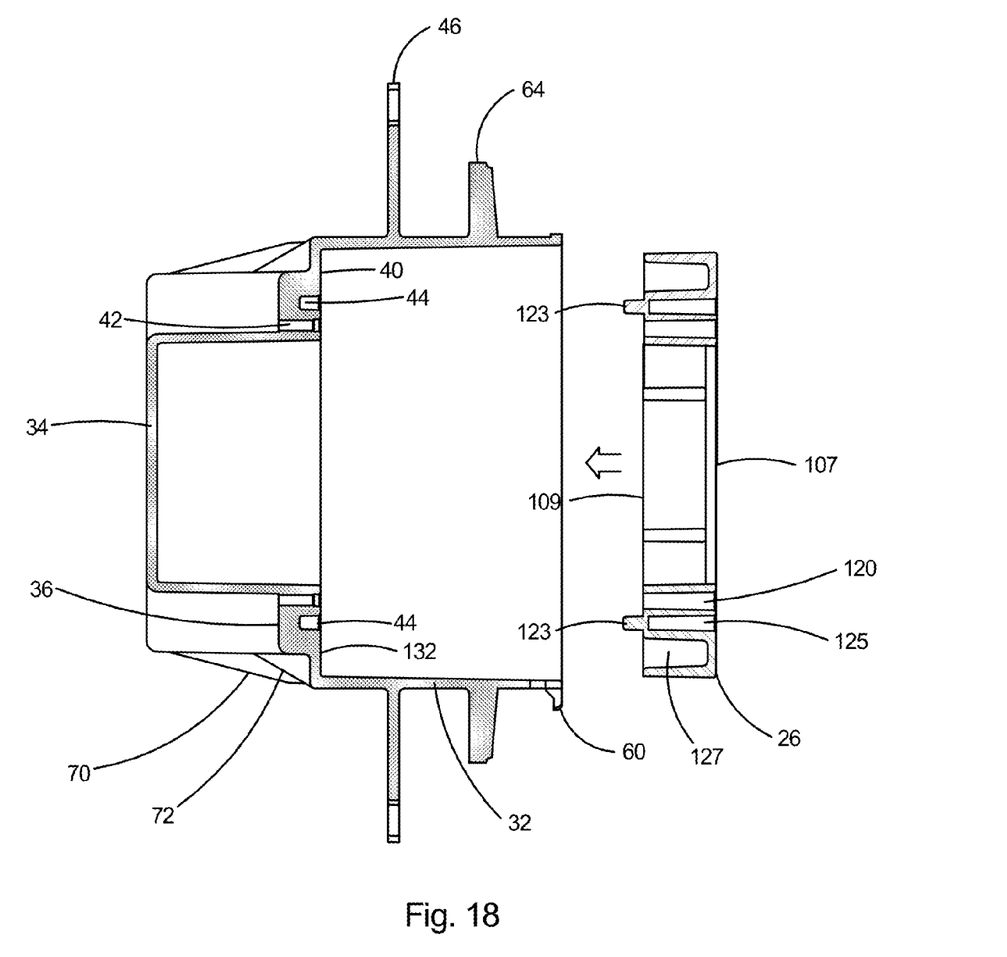
FIG. 18 is a sectional view depicting a spacer in alignment with an electrical box to be inserted therein.

Referring to FIG. 18, for those situations in which it is desired that an electrical component need not be recessed as far as peripheral wall 40, spacer 26 is inserted into electrical box 22 to reduce the depth of the component within the box. Alignment tabs 123 enable rapid alignment of spacer 26 with the electrical box. When spacer 26 is inserted within the box 22, alignment tabs 123 engage grooves 44 in peripheral wall 40 and nest therein.

Figure 19:
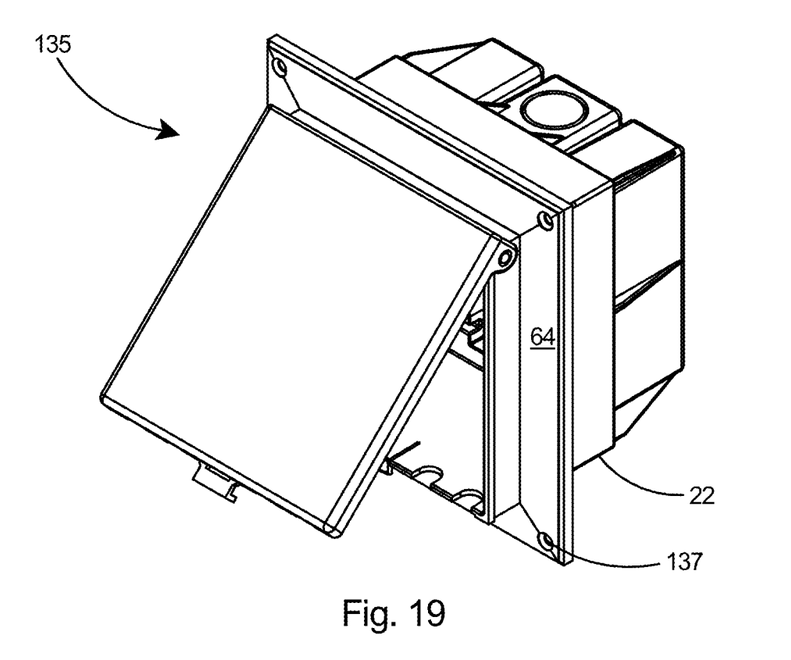
FIG. 19 is an isometric view of an alternative embodiment of an electrical box according to the present invention.
Figure 20:
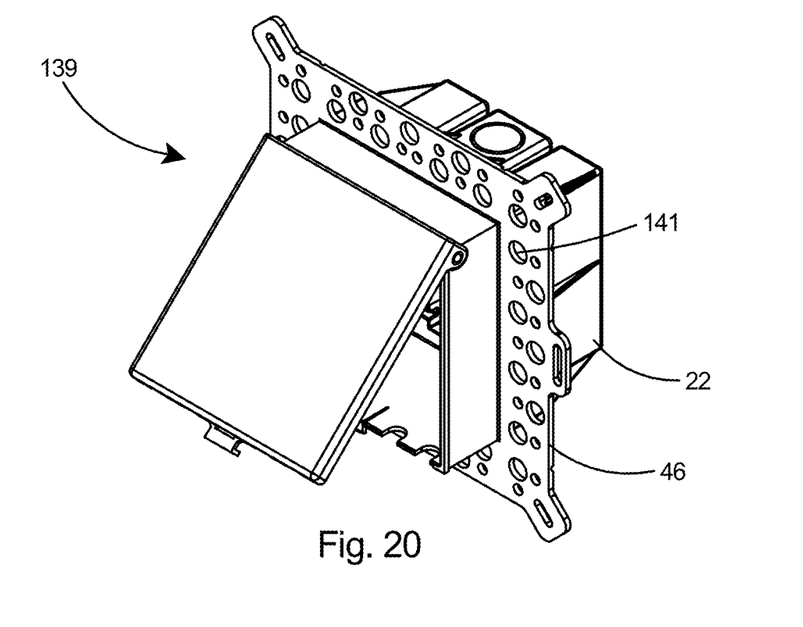
FIG. 20 is an isometric view of another alternative embodiment of an electrical box according to the present invention.

With reference to FIGS. 19 and 20, there are shown two alternative embodiments of the electrical box, including in FIG. 19 an electrical box 135 for retrofit on an existing building. For this electrical box 135, the inner flange is eliminated and outer flange 64 is retained. A plurality of apertures 137 are included in outer flange 64. To operate the retrofit electrical box, a hole is cut in the outer wall of the building large enough to accommodate outer walls 32 of electrical box. Electrical box 135 is then inserted into the hole (not shown) until outer flange 64 is flush with the exterior wall. Fasteners (not shown) are then driven through apertures 137 to secure electrical box 135 to the wall. Caulking may be applied around the perimeter of the box where it contacts the wall in order to seal against rain and moisture.

FIG. 20 depicts an electrical box 139 for new construction on which stucco will be applied. For this electrical box 139, the outer flange is eliminated and inner flange 46 is retained. A plurality of apertures 141 are included in inner flange 46. To operate the electrical box for stucco construction, a hole is cut in the outer wall of the building large enough to accommodate outer walls 32 of electrical box. Electrical box 139 is then inserted into the hole (not shown) until inner flange 46 is flush with the exterior wall. Fasteners (not shown) are then driven through slots 50 to secure electrical box 139 to the wall. Stucco is then applied over inner flange 46 to the desired depth. Apertures 141 in inner flange 46 promote better adhesion of stucco to the flange and to the surrounding wall (not shown).

The electrical box 22, cover member 24 and spacer 26 of the present invention may be manufactured of metal or plastic. Preferably the electrical box 22, cover member 24 and spacer 26 of the present invention are each molded in one piece of plastic.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A spacer for reconfiguring a recessed electrical box to mount electrical components at a shallower depth within the recessed electrical box, said spacer comprising:
   a frame member including two end members and two side members defining an opening therein, said frame member including a front face and a rear face;
   an arm extending inward from each of said end members;
   an aperture in each of said arms of said spacer;
   said end members including an outer wall, an inner wall, and a material saving opening between said outer wall and inner wall;
   an alignment tab extending from said arm at said rear face of said frame, said alignment tab enabling rapid alignment of said spacer with said recessed electrical box; and
   a through bore extending through each of said arms of said frame member, said through bore adapted for axial alignment with component mounting bores in said electrical box to enable insertion of fasteners for the connection of electrical components to said spacer and said electrical box.

2. The spacer of claim 1 further comprising a bridge extending between the outer wall and inner wall.

3. The spacer of claim 2 further comprising an aperture in said bridge, said aperture in said bridge enabling insertion of a fastener through said bore of said peripheral wall of said electrical box into said aperture in said bridge.

4. The spacer of claim 1 further comprising a plurality of integral ribs extending inward from said side members.

5. The spacer of claim 1 further comprising a peripheral wall extending orthogonally from said front face of said frame member.

6. The spacer of claim 1 wherein said front face and said rear face of said spacer are planar.

7. The spacer of claim 6 wherein said alignment tabs extend outward from said planar rear face.

8. The spacer of claim 1 further comprising an aperture extending into each of said arms from said front face.

9. A method for reducing the mounting depth of an electrical component within an electrical enclosure, the method comprising steps of: providing the electrical enclosure including outer sidewalls defining the electrical enclosure, a peripheral wall having a planar face, and a bore in said peripheral wall; providing a spacer including a frame member having two end members, two side members, a rear face, an arm extending inward from each of said end members, and an aperture in each of said arms, said end members including an outer wall, an inner wall, and a material saving opening between said outer wall and inner wall; inserting said spacer within said electrical enclosure until said rear face of said spacer seats against said planar face of said peripheral wall of said electrical enclosure; securing said spacer to said peripheral wall of said electrical enclosure; and mounting an electrical component to said apertures in each of said arms of said spacer.

10. The method of claim 9 further comprising
   providing a bridge extending between said outer wall and said inner wall, and an aperture in said bridge; and
   securing said spacer to said peripheral wall of the electrical enclosure by inserting a fastener through said bore of said peripheral wall of said electrical enclosure into said aperture in said bridge.

11. The method of claim 9 further comprising
   providing an alignment tab extending from each of said arms at said rear face of said spacer;
   providing a groove in said peripheral wall of the electrical enclosure; and
   aligning said alignment tabs of said spacer with said grooves of the electrical enclosure.

* * * * *